(12) United States Patent
Finkelstein et al.

(10) Patent No.: US 8,954,465 B2
(45) Date of Patent: Feb. 10, 2015

(54) CREATING QUERY SUGGESTIONS BASED ON PROCESSING OF DESCRIPTIVE TERM IN A PARTIAL QUERY

(75) Inventors: Lev Finkelstein, Netanya (IL); Artiom Myaskouvskey, Haifa (IL); Alexandru Marius Pasca, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/477,710

(22) Filed: May 22, 2012

(65) Prior Publication Data

US 2014/0143268 A1 May 22, 2014

(51) Int. Cl.
*G06F 17/30* (2006.01)
(52) U.S. Cl.
USPC ........................................ 707/767
(58) Field of Classification Search
USPC ................. 707/706, 707, 730, 767
See application file for complete search history.

(56) References Cited

U.S. PATENT DOCUMENTS

| | | | |
|---|---|---|---|
| 7,487,145 B1 | 2/2009 | Gibbs et al. | |
| 7,499,940 B1 | 3/2009 | Gibbs | |
| 7,756,855 B2 | 7/2010 | Ismalon | |
| 7,836,044 B2 | 11/2010 | Kamvar et al. | |
| 2009/0094221 A1* | 4/2009 | Cameron et al. | 707/5 |
| 2011/0184951 A1* | 7/2011 | Paparizos et al. | 707/737 |
| 2012/0084297 A1* | 4/2012 | Mishne et al. | 707/748 |
| 2012/0117102 A1* | 5/2012 | Meyerzon et al. | 707/767 |

FOREIGN PATENT DOCUMENTS

WO 2006055120 7/2006

OTHER PUBLICATIONS

Ju Fan et al., Interactive SQL query suggestion: Making databases user-friendly, 2011, IEEE, 351-362.*

* cited by examiner

*Primary Examiner* — Jean B Fleurantin
(74) *Attorney, Agent, or Firm* — Middleton Reutlinger

(57) ABSTRACT

Methods and apparatus related to processing of at least one descriptive term of a query to obtain at least one query suggestion for a query. A descriptive term may be identified in a partial search query. A modified partial query suggestion request for the partial search query may be transmitted that omits the descriptive term. At least one query suggestion result for the modified partial query suggestion request may be received and the descriptive term reinserted into the query suggestion result.

28 Claims, 6 Drawing Sheets

601. fat orange cat
602. [fat] orange cat
603. fat [orange] cat
FIG. 6A
605. funny videos of red dogs
606. funny videos of [red] dogs
607. [funny] videos of red dogs
FIG. 6B
610. funny videos of red do
611. funny videos of [red] do
612. [funny] videos of red do
FIG. 6C
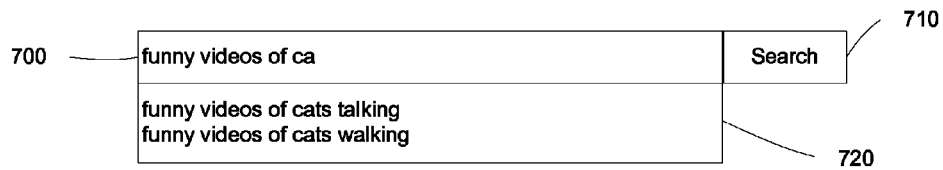
FIG. 7
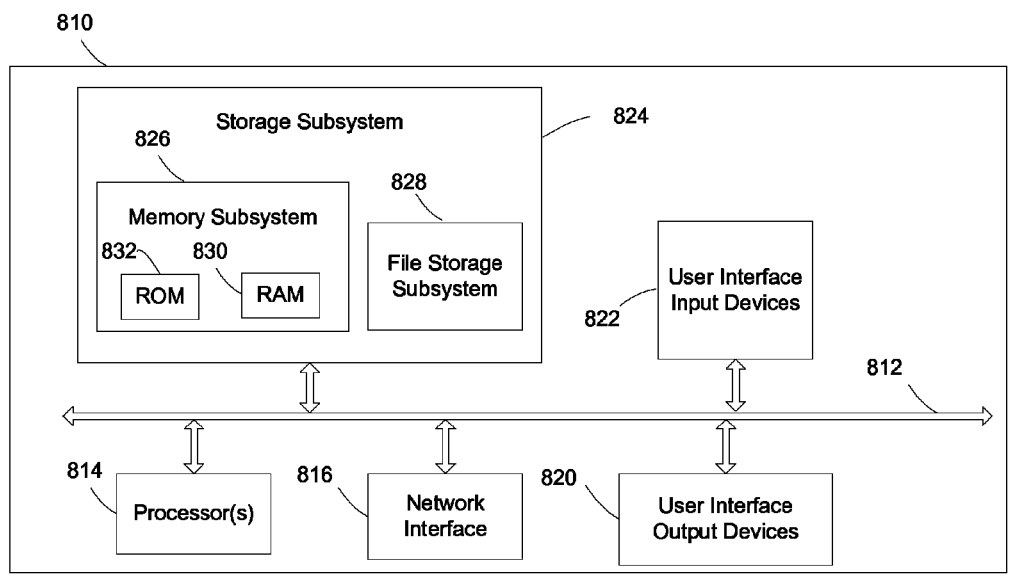
FIG. 8

CREATING QUERY SUGGESTIONS BASED ON PROCESSING OF DESCRIPTIVE TERM IN A PARTIAL QUERY

BACKGROUND

This specification is directed generally to query suggestions for a query. Information retrieval systems, such as Internet search engines, enable users to locate information in a large database. For example, Internet search engines enable users to access information such as web pages, images, text documents, and/or multimedia content in response to a search query submitted by a user consisting of one or more search terms.

Some information retrieval systems may provide one or more query suggestions to a user as the user is typing a query. The query suggestions(s) essentially complete the partial query by typing ahead for the user. The user may choose one of the query suggestions to utilize as a submitted query and/or to utilize as the basis for a submitted query (e.g., by modifying, adding to, and/or subtracting from the selected query suggestion). The query suggestions are often generated via past user queries and/or generated automatically.

SUMMARY

The present disclosure is directed to methods and apparatus for creating query suggestions. For example, some implementations are directed to methods and apparatus for creating query suggestions for a query based on processing one or more descriptive terms in the query in a special manner.

In some implementations a computer implemented method for generating query suggestion results for a partial search query is described that includes the steps of: identifying, in a partial search query having a plurality of terms, a descriptive term of the plurality of terms that is paired with at least one described term of the plurality of terms; transmitting a modified partial query suggestion request for the partial search query, the modified partial query suggestion request omitting the descriptive term and including the at least one described term; receiving at least one query suggestion result for the modified partial query suggestion request, the query suggestion result containing the described term; and reinserting the descriptive term into the query suggestion result.

This method and other implementations of technology disclosed herein may each optionally include one or more of the following features.

The method may further include sending an unmodified partial query suggestion request for the partial query that contains the descriptive term. In some implementations the step of sending the modified partial query suggestion request for the partial search query only occurs when the unmodified partial query suggestion request fails to return results. In some implementations the step of sending the modified partial query suggestion request for the partial search query only occurs when the unmodified partial query suggestion request returns less than a minimum number of results. In some implementations the step of sending the modified partial query suggestion request for the partial search query only occurs when the unmodified partial query suggestion request returns results having less than a minimum level of frequency of query. In some implementations the step of sending the modified partial query suggestion request for the partial search query only occurs when the unmodified partial query suggestion request returns less than a minimum number of results having more than a minimum level of frequency of query.

The method may further include identifying, in the partial search query, a second descriptive term of the plurality of terms; sending a second modified partial query suggestion request for the partial search query, the second modified partial query suggestion request omitting the second descriptive term; receiving at least one second query suggestion result for the second modified partial query suggestion request; and reinserting the second descriptive term into the second query suggestion result. In some implementations the second modified partial query suggestion request includes the first descriptive term. In some implementations the second descriptive term is positionally immediately adjacent the first descriptive term in the partial search query. In some implementations the method further includes assigning display order priorities to the first query suggestion result and the second query suggestion result. The display order priorities may be determined by comparison of a first level of frequency of query of the first query suggestion result and a second level of frequency of query of the second query suggestion result.

The method may further include validating that the step of reinserting the descriptive term into the query suggestion result does not substantially alter the meaning of the query suggestion result.

The method may further include transmitting the query suggestion result with the descriptive term reinserted to at least one client computing device.

The step of identifying the descriptive term may include consulting a database of descriptive terms. In some implementations the step of identifying the descriptive term includes locating the descriptive term in the database of descriptive terms. In some implementations the step of identifying the descriptive term includes analyzing the context of the descriptive term in the partial search query.

The descriptive term may be reinserted into the query suggestion result in the same location that it previously occupied in the partial search query.

In some implementations a computer implemented method for generating query suggestions results for a search query is described that includes the steps of: identifying, in a search query having a plurality of terms, a descriptive term of the plurality of terms; transmitting a modified query suggestion request for the search query, the modified query suggestion request omitting the descriptive term and including other of said terms; receiving a plurality of query suggestion results for the modified query suggestion request, the query suggestion results containing the described term; omitting at least one unsatisfactory suggestion results from the query suggestion results based on at least one characteristic of the unsatisfactory suggestion result to form a pruned set of the query suggestion results; and reinserting the descriptive term into each of the query suggestion results of the pruned set.

This method and other implementations of technology disclosed herein may each optionally include one or more of the following features.

The at least one characteristic may include at least one of ranking signal and frequency of query.

The method may further include sending an unmodified partial query suggestion request for the partial query that contains the descriptive term. In some implementations the step of sending the unmodified partial query suggestion request generates at least one unmodified suggestion result. In some implementations the at least one characteristic includes at least one of ranking signal and frequency of query of the unsatisfactory suggestion result as compared to the unmodified suggestion result. In some implementations the method may further include assigning display order priorities to the unmodified suggestion result and the query suggestion results of the pruned set. In some implementations the display order priorities may be based on at least one of ranking signal and frequency of query of the unmodified suggestion result and the query suggestion results of the pruned set. In some implementations the step of sending the modified partial query suggestion request for the partial search query only occurs when the unmodified partial query suggestion request fails to return results. In some implementations the step of sending the modified partial query suggestion request for the partial search query only occurs when the unmodified partial query suggestion request returns less than a threshold number of results having more than a minimum level of ranking signal.

Other implementations may include a non-transitory computer readable storage medium storing instructions executable by a processor to perform a method such as one or more of the methods described above. Yet another implementation may include a system including memory and one or more processors operable to execute instructions, stored in the memory, to perform a method such as one or more of the methods described above.

Particular implementations of the subject matter described herein process one or more descriptive terms in a query to create query suggestions for potential utilization in one or more information retrieval systems. These one or more query suggestions represent new query suggestions that are derived from one or more modified query suggestion requests that are based on the query with one or more descriptive terms of the query being removed. The query suggestions may be utilized by one or more information retrieval systems to provide improved query autocompletions to users of the information retrieval systems.

It should be appreciated that all combinations of the foregoing concepts and additional concepts discussed in greater detail herein are contemplated as being part of the inventive subject matter disclosed herein. For example, all combinations of claimed subject matter appearing at the end of this disclosure are contemplated as being part of the inventive subject matter disclosed herein.

BRIEF DESCRIPTION OF THE DRAWINGS

FIG. 6A illustrates three example query suggestion requests that may be transmitted for a first query.

FIG. 6B illustrates three example query suggestion requests that may be transmitted for a second query.

FIG. 6C illustrates three example query suggestion requests that may be transmitted for a third query.

FIG. 7 is a screenshot that illustrates an example environment that can be used to provide query suggestion results to a user.

FIG. 8 illustrates a block diagram of an example computer system.

DETAILED DESCRIPTION

Figure 1:
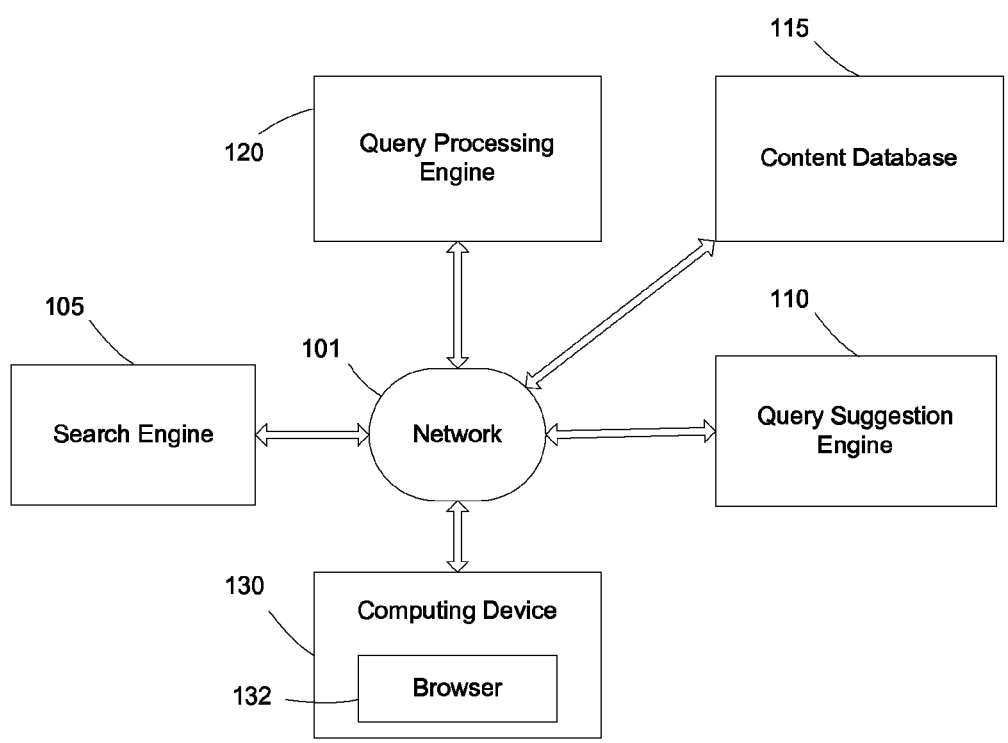
FIG. 1 is a block diagram of an example environment in which an implementation of a method of generating a query suggestion result for a search query may be implemented.

Referring to FIG. 1, a block diagram is illustrated of an example environment in which implementations of a method of generating a query suggestion result for a search query may be implemented. The environment includes computing device 130, search engine 105, query processing engine 120, content database 115, and query suggestion engine 110. The environment also includes a communication network 101 that enables communication between various components of the environment.

The query processing engine 120 may process a search query according to aspects of one or more implementations of methods described herein to facilitate the obtaining of one or more query suggestions via the special processing of one or more descriptive terms in the search query. The query processing engine 120 may perform one or more of the steps such as one or more steps of methods described herein. The query processing engine 120 may be implemented in hardware, firmware, and/or software running on hardware. For example, the query processing engine 120 may be implemented in one or more computer servers and/or one or more client computing devices. The query processing engine 120 may optionally contain one or more modules such as, for example, a descriptive term identification module, a query suggestion analysis module, and/or a descriptive term reinsertion module. The query processing engine 120 is described in more detail herein with reference to additional Figures herein.

In some implementations the partial query that is processed by the query processing engine 120 may be a partial query entered by a user for submission to an information retrieval system such as search engine 105. In some implementations a user may interact with the search engine 105 through a client computing device 130. The client computing device 130 and the search engine 105 each include memory for storage of data and software applications, a processor for accessing data and executing applications, and components that facilitate communication over a communication network 101. The computing device 130 executes one or more applications, such as web browsers (e.g., web browser 132), that enable the user to formulate completed queries and submit completed queries to the search engine 105. In some implementations completed queries may be submitted directly to the search engine 105 from the computing device 130. In some implementations completed queries may be submitted from the query suggestion engine 110 and/or query processing engine 120 to the search engine 105. The search engine 105 receives a completed query and executes the completed query against a search engine content database (e.g., implemented in content database 115) of available documents such as web pages, images, text documents, and/or multimedia. The search engine 105 identifies content which matches the submitted query and responds by generating search results that are transmitted to the computing device 130 in a form that can be presented to the user. For example, in response to a query from the computing device 130, the search engine 105 may transmit a plurality of search results to be displayed in the web browser 132 that is executing on the computing device 130.

The search engine 105 may maintain log files of past queries submitted to the search engine by prior users during prior query sessions. The log files may be stored on one or more computers and/or storage devices such as, for example, content database 115. The content database 115 may include one or more storage mediums. For example, in some implementations the content database 115 may include multiple computer servers each containing one or more storage mediums. Any maintained log files may be anonymous logs not traceable to a particular user.

The one or more applications executing on the computing device 130 also provide partial queries being formulated by users, before the users have indicated completion of the queries. The applications may be, for example, a web browser, a toolbar running in a web browser, and/or a search client running on the computing device 130. In some implementations the applications provide each character of a query as it is typed or otherwise entered by the user. In some implementations the applications provide multiple characters at a time, optionally following a pause by the user between character entries.

A partial query is a query formulated by a user prior to an indication by the user that the query is a completed query. In some implementations a user may indicate a completed query by entering a carriage return and/or other character. In some implementations a user may indicate a completed query by selecting a search button in a user interface presented to the user. In some implementations a user may indicate a completed query by speaking a command in a speech user interface. In some implementations a user may indicate a completed query by pausing more than a predetermined amount of time during entering of the query. One of ordinary skill in the art, having had the benefit of the present disclosure, will recognize and appreciate that other forms of providing a partial query and/or indicating a completed query may optionally be utilized.

In some implementations, in response to a partial query, the search engine 105 receives the partial query and forwards the partial query to the query suggestion engine 110. In some implementations, in response to a partial query, the one or more applications executing on the computing device 130 may optionally directly forward the partial query to the query suggestion engine 110. For example, in some implementations the browser 132 may directly forward the partial query to the query suggestion engine 110. The query suggestion engine 110 includes memory for storage of data and software applications, a processor for accessing data and executing applications, and components that facilitate communication over the communication network 101. The query suggestion engine 110 may then match the submitted partial query to one or more of a plurality of query suggestions that are an appropriate match to the partial query. In some implementations the query suggestions may represent potential completed queries and be provided to a user to enable the user to choose one of the query suggestions as a completed query for utilization in a search. In some implementations the query suggestions may be determined based on a list of past user queries, a list of automatically generated queries, and/or real time automatically generated queries. For example, the query suggestion engine 110 may use prefix based matching to identify query suggestions from a list of past user queries. The query suggestion engine 110 then provides these query suggestions to a user. In some implementations the query suggestion engine 110 may provide the query suggestions to a user via the search engine 105, the query processing engine 120, and/or to the computing device 130 directly. Any listing of past user queries and/or past automatically generated queries may optionally be stored in a query suggestion content database such as content database 115, for potential utilization as query suggestions.

These query suggestions provided by the query suggestion engine 110 represent queries that a user may want to submit in addition to or instead of the partial queries actually being typed. The query suggestions may, for example, be displayed within a cascaded drop down menu of the search field of an application, such as a web browser executing on the computing device 130, as the user is typing the query. In some implementations one or more search results for a query suggestion may also optionally be displayed as the user is typing the query in the drop down menu and/or elsewhere.

In some implementations the search engine 105 and/or the computing device 130 may optionally additionally or alternatively provide a completed query to the query suggestion engine 110. A completed query is a query that the user has indicated is complete. The query suggestion engine 110 may then match the completed query to one or more query suggestions to determine one or more query suggestions for the user's completed query. The query suggestion engine 110 then provides these query suggestions to the user. In some implementations the suggestion engine 110 may provide the query suggestions to a user via the search engine 105, the query processing engine 120, and/or the computing device 130 directly. The query suggestions may, for example, be embedded within a search results web page to be displayed in an application, such as the web browser 132, as potential further search options.

The communication network 101 facilitates communication between the various components in the environment. In some implementations the communication network 101 may include the Internet, one or more intranets, and/or one or more bus subsystems. The communication network 101 may optionally utilize one or more standard communications technologies, protocols, and/or inter-process communication techniques.

Many other configurations are possible having more or less components than the environment shown in FIG. 1. For example, although the query processing engine 120 is illustrated alone in FIG. 1, it is understood that the query processing engine 120 may optionally be combined with one or more of the query suggestion engine 110, the search engine 105, and/or the computing device 130 in some implementations. For example, the query processing engine 120 may optionally be combined as part of the web browser 132 and/or as a separate application of the computing device 130. Also, for example, the query processing engine 120 and the query suggestion engine 110 may be combined in some implementations.

Figure 2:
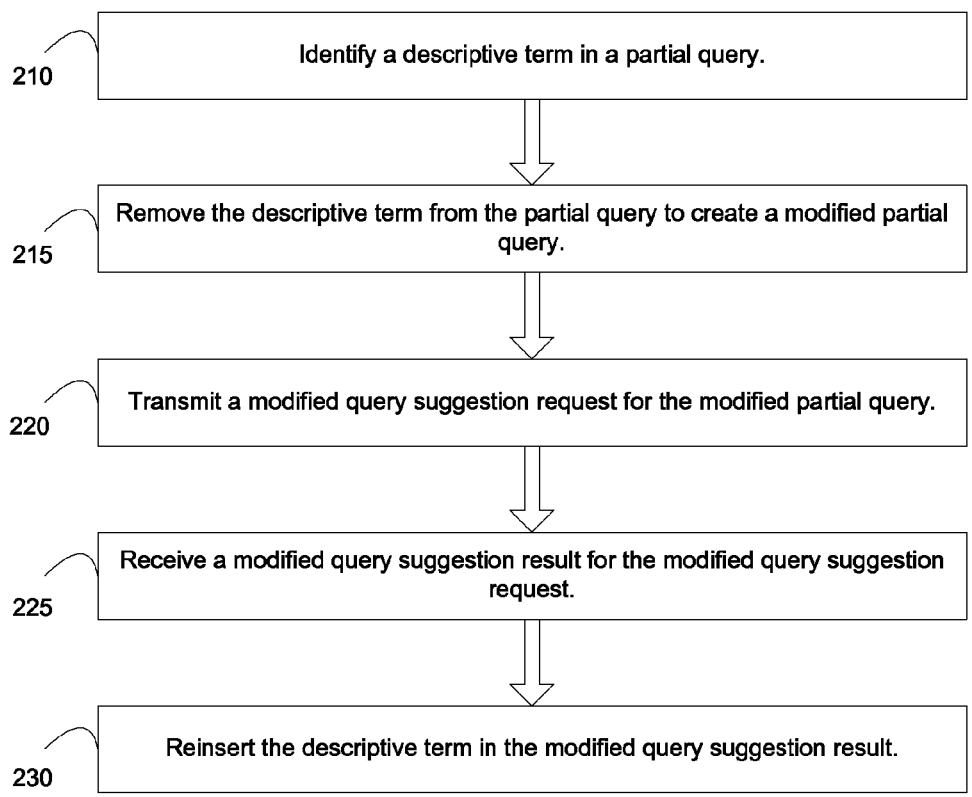
FIG. 2 is a flow chart illustrating an example method of generating a query suggestion result for a partial search query.

Referring to FIG. 2, a flow chart illustrating steps of an example method of generating a query suggestion result for a partial search query is illustrated. Other implementations may perform the steps in a different order, omit certain steps, and/or perform different and/or additional steps than those illustrated in FIG. 2. For convenience, aspects of FIG. 2 will be described with reference to a system of one or more computers that perform the process. The system may include, for example, the query processing engine 120 of FIG. 1.

At step 210 a descriptive term is identified in a partial query. For example, in a partial query of "funny videos of ca", the term "funny" may be identified as the descriptive term. In some implementations the descriptive term may be identified utilizing the descriptive term identification module of the query processing engine 120. In some implementations the partial query may be transmitted to the query processing engine 120 from search engine 105 through communications network 101. In some implementations the partial query may be transmitted to the query processing engine 120 from the computing device 130 through communications network 101 (either directly or via the search engine 105).

In some implementations the query processing engine 120 may identify whether a term in a partial query is a descriptive term by comparing that term against a database of known descriptive terms. For example, a descriptive term database (e.g., stored in content database 115) may include a listing of known descriptive terms and be consulted by a descriptive term identification module to identify whether a term in a partial query is a descriptive term. One or more canonicalization or other rules may optionally be applied to a term from the partial query to modify the term prior to comparing it to the database of known descriptive terms. For example, a term may be stemmed prior to comparing it to the database of known descriptive terms. Also, for example, a term may be checked for spelling accuracy and any spelling errors corrected prior to comparing it to the database of known descriptive terms. Also, for example, a term that does not yet form a complete word may optionally be autocompleted prior to comparing it to the database of known descriptive terms. In some implementations certain terms of a partial query may not be analyzed to determine whether they are descriptive. For example, in some implementations stop words may not be analyzed to determine whether they are descriptive.

In some implementations a term may be identified as a descriptive term if it is in the descriptive term database, regardless of its context in the partial query. For example, a term may be identified as a descriptive term regardless of which other terms it co-occurs with in the partial query and/or regardless of its positional location in the partial query. For example, in some implementations a term may be identified as a descriptive term regardless of whether it occurs at the beginning, at the end, immediately preceding a typical noun (e.g., in a language such as English), or immediately following a typical noun (e.g., in a language such as Spanish). In some implementations whether a descriptive term is identified as a descriptive term in a partial query may be based the context of the term in the partial query. For example, whether a term is identified as a descriptive term may be based on one or more of statistical analysis, part-of-speech tagging, a dependency parser, and/or whether a term is capitalized (which may indicate its usage as a proper noun).

For example, statistics may be utilized to identify a descriptive term based on how often it co-occurs with other terms. For instance, if a term is determined to frequently co-occur immediately preceding a number of nouns in a plurality of search queries or other documents, then it may be deduced that such term is likely an adjective. Also, for example, statistics may be developed regarding co-occurrence of two terms and how likely it is that one of the two terms is a descriptive term when it occurs with the other term (e.g., directly adjacent to the other term, within a predetermined positional distance of the other term, or anywhere in a partial query with the other term). For instance, the term "happy" may typically be identified as a descriptive term, but statistics and/or rules may indicate that when it co-occurs with "gilmore" in a query, then it is unlikely that the term "happy" is a descriptive term. Rather, it is likely that when "happy" and "gilmore" co-occur it is referencing the proper noun and film "Happy Gilmore".

Also, for example, part-of-speech tagging may be utilized to determine whether a term is a descriptive term. Part-of-speech tagging utilizes one or more algorithms that associate terms in accordance with a set of categorizing tags (e.g., nouns, verbs, adjectives, adverbs). The part-of-speech tagging algorithms may optionally analyze the context of the term in the partial query (e.g., analyzing which other terms it co-occurs with in the partial query and/or its positional location in the partial query) to determine whether the term is a descriptive term. Also, for example, a dependency parser may be utilized to determine whether a term is a descriptive term. In some implementations a dependency parser may examine the relation between a word and its dependents to determine whether the word is a descriptive term.

In some implementations that analyze a term's context in a partial query to determine whether the term is a descriptive term, the context may only be selectively analyzed, based on one or more considerations. For example, certain terms may be tagged to be identified as a descriptive term if it is in the descriptive term database regardless of its context in the partial query, while other terms may be tagged to require further analysis based on the context of the term in the partial query prior to being identified as a descriptive term. Also, for example, the length of a query and/or the other terms that are present in a query may be considered in determining whether it is necessary to analyze a term's context in the query to determine whether the term is a descriptive term.

Descriptive terms may include, for example, adjectives and/or adverbs. Descriptive terms may also include those words that are commonly identified as descriptive in nature such as slang words, newly created words, and other created jargon that are typically utilized in a descriptive manner. As discussed herein, a database of descriptive terms may be utilized in identifying a descriptive term in a query. The database may optionally be continuously or periodically updated to incorporate one or more new terms that are being utilized in a descriptive manner and/or to purge one or more stale terms. In some implementations the database of descriptive terms may be created through analysis of a corpus of documents such as, for example, a corpus of submitted search queries. Semantic analysis such as, for example, statistical analysis and/or part-of speech tagging may be utilized to identify descriptive terms that are present in a document of the corpus. In some implementations whether a descriptive term is identified as a descriptive term in a corpus document may be based the context of the term in the document. For example, whether a term is identified as a descriptive term may be based on one or more of statistical analysis, part-of-speech tagging, and/or consultation of one or more preexisting databases such as a preexisting lexical database.

For example, statistics may be utilized to identify a descriptive term based on how often it co-occurs with other terms and/or where it occurs in relation to other terms. For instance, if a term is determined to frequently co-occur immediately preceding a number of nouns, then it may be deduced that such term is likely an adjective. Also, for instance, if a term is determined to frequently co-occur immediately following a number of verbs, then it may be deduced that such term is likely an adverb. Also, for example, part-of-speech tagging may be utilized to determine whether a term is a descriptive term. Any part-of-speech tagging based algorithms may optionally analyze the context of the term in the partial query (e.g., analyzing which other terms it co-occurs with in the partial query and/or its positional location in the partial query) to determine whether the term is a descriptive term.

In some implementations all unique descriptive terms that are present in a corpus may be stored in the database. In some implementations one or more heuristics may be utilized in creating the database. For example, canonicalization rules may be utilized in creating the database such as, for example, stemming of descriptive terms and/or removal of low frequency words to minimize the size of the database and/or to ensure only those terms that are truly descriptive and/or at least of a threshold popularity are included.

At step 215 the identified descriptive term is removed from the partial query to create a modified partial query. For example, in the submitted partial query of "funny videos of ca", the identified descriptive term "funny" may be removed to create the modified partial query "videos of ca". In some implementations the descriptive term may be removed and the modified partial query created utilizing the query processing engine 120.

At step 220 a modified query suggestion request is transmitted for the modified partial query. For example, in the submitted partial query of "funny videos of ca", the identified descriptive term "funny" that modifies the described term "videos" may be removed to create the modified partial query "videos of ca", for which a query suggestion request is transmitted. In some implementations the modified query suggestion request may be transmitted by the query processing engine 120 to the query suggestion engine 110 via communications network 101. Prior to transmitting the query suggestion request for the modified partial query, at least one other character forming a term apart from the identified descriptive term needs to be present in the partial query to enable the modified partial query to contain one or more characters to analyze.

At step 225 a modified query suggestion result is received for the modified partial query request. For example, for the submitted partial query of "videos of ca", the query suggestion result "videos of cats talking" may be received. In some implementations the modified query suggestion result may be transmitted to the query processing engine 120 from the query suggestion engine 110 via communications network 101.

At step 230 the descriptive term that was removed in step 215 is reinserted in the received modified query suggestion result. For example, for the modified query suggestion result "videos of cats talking", the descriptive term "funny" may be reinserted into the modified query suggestion result to obtain a reconstructed modified query suggestion result of "funny videos of cats talking". In some implementations the query processing engine 120 may reinsert the descriptive term into the received modified query suggestion result. In some implementations the descriptive term is reinserted in a position that corresponds to its position in the initial partial query. For example, the descriptive term may have immediately preceded a first term and/or immediately followed a second term and may be reinserted in the modified query suggestion result so as to immediately precede the first term and/or immediately follow the second term in the modified query suggestion result. In some implementations the descriptive term may be reinserted utilizing the query processing engine 120.

Figure 3:
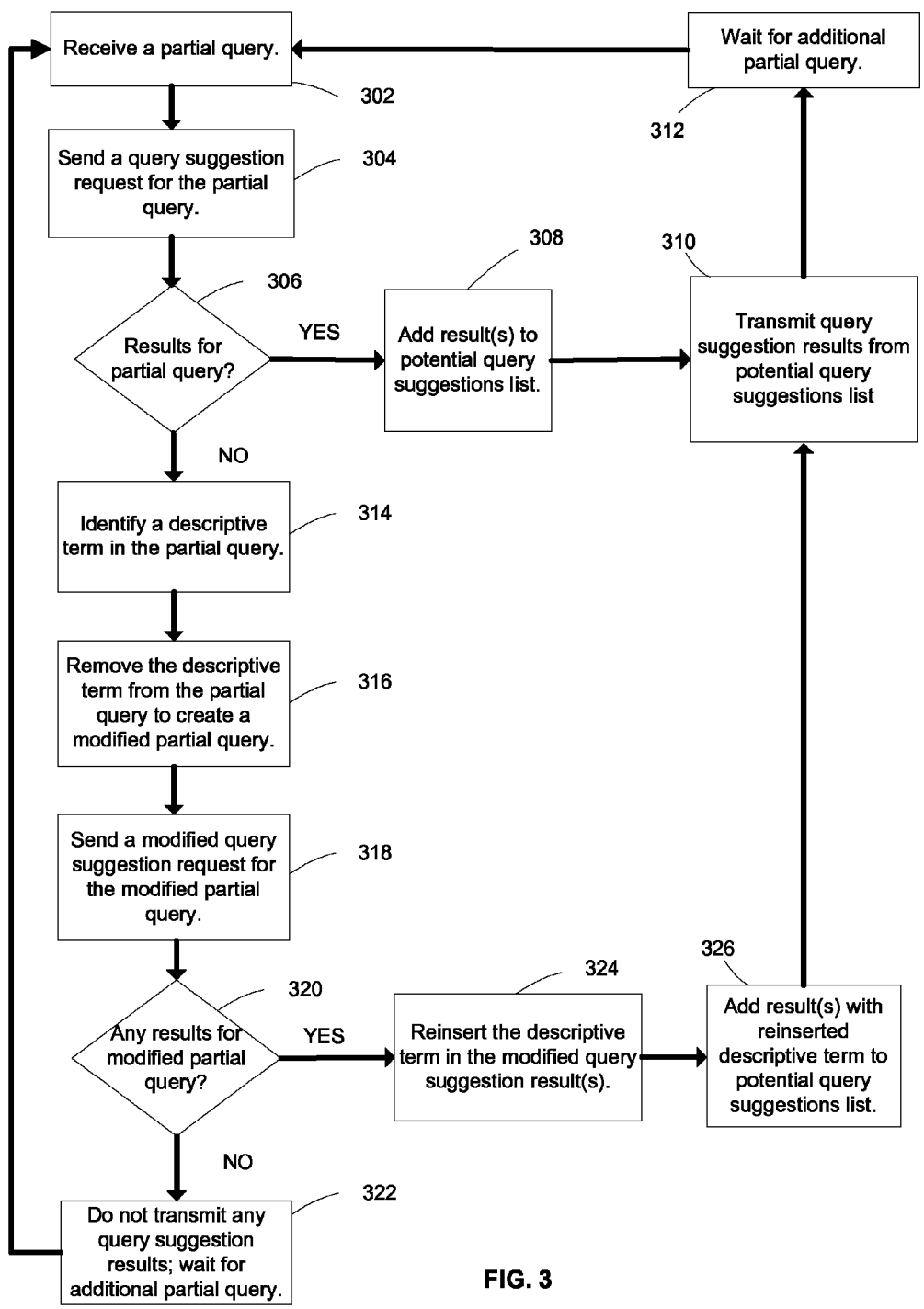
FIG. 3 is a flow chart illustrating an example method of generating query suggestion results for a partial search query in which a modified query suggestion request that omits a descriptive term is only performed if an initial partial search query suggestion request fails to return results.

Referring to FIG. 3, a flow chart illustrating an example method of generating autocompletion results for a partial search query is illustrated. In the implementation of FIG. 3, a modified query suggestion request that omits a descriptive term is only performed if an initial partial search query fails to return results. Other implementations may perform the steps in a different order, omit certain steps, and/or perform different and/or additional steps than those illustrated in FIG. 3. For convenience, aspects of FIG. 3 will be described with reference to a system of one or more computers that perform the process. The system may include, for example, the search engine 105 and/or the query processing engine 120 of FIG. 1.

At step 302 a partial query is received. For example, a submitted partial query of "top speed of italian spo" may be received. In some implementations the partial query may be received over a communications network. For example, the partial query may be received at the search engine 105 from computing device 130 through communications network 101. Also, for example, the partial query may be received at the query processing engine 120 from search engine 105 through communications network 101. Also, for example, the partial query may be received at the query processing engine 120 from the computing device 130 through communications network 101 (either directly or via the search engine 105). Also, for example, in some implementations the partial query may be received over a bus subsystem (e.g., bus subsystem 812) such as when all or aspects of the query processing engine 120 are present on the computing device generating the partial query.

At step 304 a query suggestion request is sent for the partial query. For example, a query suggestion request may be sent for the received partial query "top speed of italian spo". In some implementations the query suggestion request may be transmitted by the search engine 105 to the query suggestion engine 110 via communications network 101. In some implementations the query suggestion request may be transmitted by the query processing engine 120 to the query suggestion engine 110 via communications network 101.

At step 306 it is determined whether any query suggestion results have been returned for the partial query. Query suggestion results are query suggestions that may be provided to a user for utilization by the user as a completed query and/or as the basis for a completed query. In some implementations the query processing engine 120, the query suggestion engine 110, and/or the search engine 105 may determine whether any query suggestion results have been returned for the partial query. If query suggestion results have been returned, then at step 308 those result(s) are added to a potential query suggestions list and at step 310 query suggestion results from the potential query suggestions list are transmitted. In some implementations the query processing engine 120, the query suggestion engine 110, and/or the search engine 105 may transmit the query suggestion results to the computing device 130, which may then present the query suggestion results to a user. In some implementations all of the query suggestions from the potential query suggestions list are transmitted at step 310. In some implementations one or more query suggestions from the potential query suggestions list may not be transmitted at step 310 due to pruning of such suggestions. For example, in some implementations one or more query suggestions from the potential query suggestions list may not be transmitted at step 310 due to pruning of those potential query suggestions having results with less than a threshold signal ranking and/or less than a threshold frequency of query.

If it is determined at step 306 that query suggestion results have not been returned for the submitted partial query suggestion request, then at step 314 a descriptive term is identified in the partial query. For example, in a submitted partial query of "top speed of italian spo", the term "italian" may be identified as the descriptive term. In some implementations a descriptive term identification module of the query processing engine 120 may identify the descriptive term. In some implementations the query processing engine 120 may identify whether a term in a partial query is a descriptive term by comparing that term against a database of known descriptive terms. In some implementations a descriptive term may be identified as a descriptive term if it is in the descriptive term database, regardless of its context in the partial query. In some implementations whether a descriptive term is identified as a descriptive term in a partial query may be based at least in part on the context of the term in the partial query. If no descriptive term is identified at step 314, then in some implementations steps 314-320 may be skipped and the method may proceed to step 322. In some implementations step 314 of FIG. 3 and step 210 of FIG. 2 may include one or more common aspects.

At step 316 the identified descriptive term is removed from the partial query to create a modified partial query. For example, in the submitted partial query of "top speed of italian spo", the identified descriptive term "italian" that modifies the described term "spo" may be removed to create the modified partial query "top speed of spo". In some implementations the descriptive term may be removed and the modified partial query created utilizing the query processing engine 120. In some implementations step 316 of FIG. 3 and step 215 of FIG. 2 may include one or more common aspects.

At step 318 a modified query suggestion request is transmitted for the modified partial query. For example, in the submitted partial query "top speed of italian spo", the identified descriptive term "italian" may be removed to create the modified partial query "top speed of spo", for which a query suggestion request is transmitted. In some implementations the modified query suggestion request may be transmitted by the query processing engine 120 to the query suggestion engine 110 via communications network 101. In some implementations step 318 of FIG. 3 and step 220 of FIG. 2 may include one or more common aspects.

At step 320 it is determined whether any query suggestion results have been returned for the modified partial query. In some implementations the query processing engine 120, the query suggestion engine 110, and/or the search engine 105 may determine whether any query suggestion results have been returned for the modified partial query. If no query suggestion results have been received, then at step 322 a wait cycle is entered until further partial queries are received at step 302. In some implementations further partial queries may be received as a result of continued inputting by a user for the same query and/or as a result of inputting a new query by a user. In some implementations step 320 of FIG. 3 and step 225 of FIG. 2 may include one or more common aspects.

If modified query suggestion results have been returned, then at step 324 the descriptive term that was removed is reinserted in the received modified query suggestion results. For example, in the modified query suggestion request for modified partial query "top speed of spo", a modified query suggestion result "top speed of sports cars" may be returned and the descriptive term "italian" may be reinserted into the modified query result to obtain a reconstructed modified query suggestion result of "top speed of italian sports cars". In some implementations the query processing engine 120 may reinsert the descriptive term into the received modified query suggestion result. In some implementations any modified query suggestion result may be transmitted to the query processing engine 120 from the query suggestion engine 110 via communications network 101. In some implementations step 324 of FIG. 3 and step 230 of FIG. 2 may include one or more common aspects.

At step 326 any reconstructed modified query suggestion results with the descriptive term reinserted are added to a potential query suggestions list and at step 310 query suggestion results from the potential query suggestions list are transmitted. In some implementations a descriptive term reinsertion module of the query processing engine 120 and/or the search engine 105 may transmit the query suggestion results to the computing device 130. In some implementations all of the query suggestions from the potential query suggestions list are transmitted at step 310.

In some implementations one or more query suggestions from the potential query suggestions list may not be transmitted at step 310 due to pruning of such suggestions. For example, in some implementations one or more query suggestions from the potential query suggestions list may not be transmitted at step 310 due to pruning those suggestions having results with less than a threshold signal ranking and/or less than a threshold frequency of query. In some implementations one or more query suggestions from the potential query suggestions list may not be transmitted at step 310 if it is determined that reinserting the descriptive term in the modified query suggestion results changes the meaning of the initial partial query (the partial query received at step 302). In some implementations a query suggestion analysis module of query processing engine 120 may determine whether reinserting the descriptive term in the modified query suggestion results changes the meaning of the initial partial query. For example, one or more heuristics may be utilized such as semantic analysis. For instance, a database of term antonyms may be consulted to determine if one of the terms that is added to a partial query by the modified query suggestion results is an antonym to the descriptive term that was removed in the modified query suggestion request. As an example, a partial query may be "videos of happy clo", the modified partial query may be "videos of clo", a modified query suggestion result of "videos of clowns that are unhappy" may be returned. The query processing engine 120 may determine that since happy and unhappy are antonyms, reinserting the descriptive term happy in that modified query suggestion result may change the meaning of the initial partial query and omit such query suggestion result from being transmitted at step 310.

At step 312 a wait cycle may be entered until further partial queries are received at step 302. In some implementations further potential queries may be received as a result of continued inputting by a user for the same query and/or as a result of inputting a new query by a user.

Figure 4:
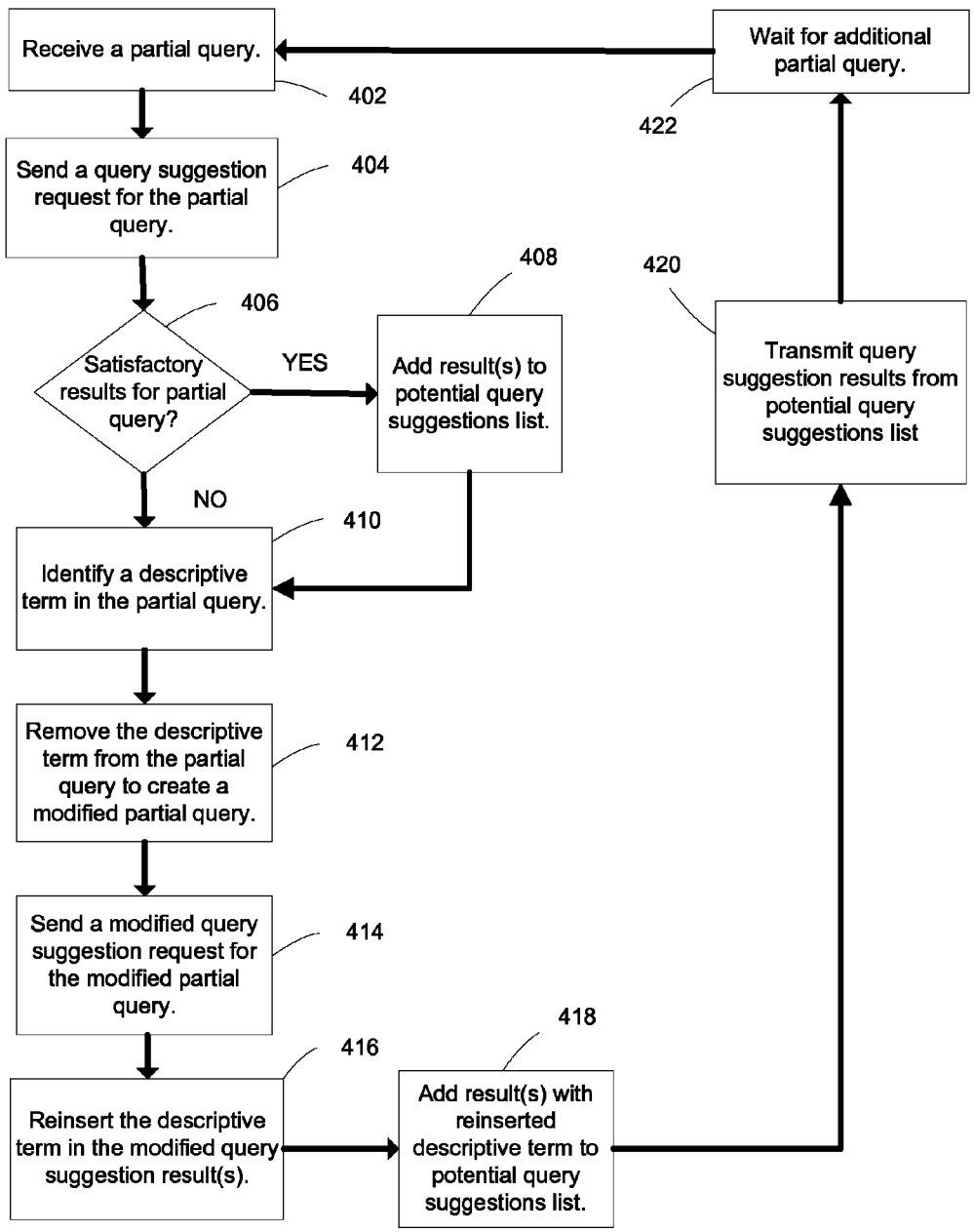
FIG. 4 is a flow chart illustrating an example method of generating query suggestion results for a partial search query in which a modified query suggestion request that omits a descriptive term is performed regardless of whether an initial partial search query suggestion request returns results.

Referring to FIG. 4, a flow chart illustrating an implementation of a method of generating autocompletion results for a partial search query is illustrated. In the implementation of FIG. 4, a modified query suggestion request that omits a descriptive term is performed regardless of whether an initial partial search query suggestion request returns results. Other implementations may perform the steps in a different order, omit certain steps, and/or perform different and/or additional steps than those illustrated in FIG. 4. For convenience, aspects of FIG. 4 will be described with reference to a system of one or more computers that perform the process. The system may include, for example, the search engine 105 and/or query processing engine 120 of FIG. 1.

At step 402 a partial query is received. In some implementations the partial query may be received over a communications network. For example, the partial query may be received at the search engine 105 from computing device 130 through communications network 101. Also, for example, the partial query may be received at the query processing engine 120 from search engine 105 through communications network 101. Also, for example, the partial query may be received at the query processing engine 120 from the computing device 130 through communications network 101 (either directly or via the search engine 105). Also, for example, in some implementations the partial query may be received over a bus subsystem (e.g., bus subsystem 812) such as when all or aspects of the query processing engine 120 are present on the computing device generating the partial query.

At step 404 a query suggestion request is sent for the partial query. In some implementations the query suggestion request may be transmitted by the search engine 105 to the query suggestion engine 110 via communications network 101. In some implementations the query suggestion request may be transmitted by the query processing engine 120 to the query suggestion engine 110 via communications network 101.

At step 406 it is determined whether any satisfactory query suggestion results have been returned for the partial query. In some implementations the query processing engine 120, the query suggestion engine 110, and/or the search engine 105 may determine whether any satisfactory query suggestion results have been returned for the partial query. Whether query suggestion results are satisfactory may be determined, for example, based on one or more of frequency of query of the query suggestion results and the ranking signal of results returned by the query suggestion results. In some implementations step 406 of FIG. 4 and step 306 of FIG. 3 may include one or more common aspects.

If satisfactory query suggestion results have been returned, then at step 308 those satisfactory result(s) are added to a potential query suggestions list. After those satisfactory result(s) are added to a potential query suggestions list, then step 410 may be performed. In some implementations, if the results are above a predetermined threshold of quality and/or quantity, then steps 410-418 may be skipped and one or more of those satisfactory results added to the potential query suggestions list at step 408 may be transmitted at step 420. For example, if it is determined that the results are of a sufficient number and have a sufficiently high frequency of query, then steps 410-418 may be skipped. In some implementations step 420 of FIG. 4 and step 310 of FIG. 3 may include one or more common aspects.

At step 410 a descriptive term is identified in the partial query. Step 410 may be performed after the satisfactory result(s) are added to the potential query suggestion list in step 408 or if it is determined at step 406 that no satisfactory query suggestion results have been returned. In some implementations a descriptive term identification module of the query processing engine 120 may identify whether a term in a partial query is a descriptive term. In some implementations step 410 of FIG. 4, step 310 of FIG. 3, and/or step 210 of FIG. 2 may include one or more common aspects.

At step 412 the identified descriptive term is removed from the partial query to create a modified partial query. In some implementations the descriptive term may be removed and the modified partial query created utilizing the query processing engine 120. In some implementations step 412 of FIG. 4, step 316 of FIG. 3, and/or step 215 of FIG. 2 may include one or more common aspects.

At step 414 a modified query suggestion request is transmitted for the modified partial query. In some implementations the modified query suggestion request may be transmitted by the query processing engine 120 to the query suggestion engine 110 via communications network 101. In some implementations step 414 of FIG. 4, step 318 of FIG. 3, and/or step 220 of FIG. 2 may include one or more common aspects.

If modified query suggestion results have been returned for the modified partial query, then at step 416 the descriptive term that was removed is reinserted in the received modified query suggestion result(s). In some implementations the query processing engine 120 may reinsert the descriptive term into the received modified query suggestion result(s). In some implementations any modified query suggestion result(s) may be transmitted to the query processing engine 120 from the query suggestion engine 110 via communications network 101. If no query suggestion results have been returned for the modified partial query, then step 418 may be skipped and one or more of any satisfactory results that were added to the potential query suggestions list at step 408 may be transmitted at step 420 (if no satisfactory results were added, then no query suggestion results will be transmitted at step 420). In some implementations step 416 of FIG. 4, step 324 of FIG. 3, and/or step 230 of FIG. 2 may include one or more common aspects.

At step 418 any reconstructed modified query suggestion results with the descriptive term reinserted are added to a potential query suggestions list. In some implementations one or more returned modified query suggestion results may not be added to the potential query suggestions list if it is determined that reinserting the descriptive term in the modified query suggestion results changes the meaning of the initial partial query (the partial query received at step 402). In some implementations a query suggestion analysis module of query processing engine 120 may determine whether reinserting the descriptive term in the modified query suggestion results changes the meaning of the initial partial query.

At step 420 query suggestion results from the potential query suggestions list are transmitted. In some implementations the query processing engine 120 and/or the search engine 105 may transmit the query suggestion results to the computing device 130. In some implementations all of the query suggestions from the potential query suggestions list (including any that were added at step 408 and/or any that were added at step 418) are transmitted at step 420. In some implementations only some of the query suggestions from the potential query suggestions list (including those that were added at step 408 and/or those that were added at step 418) are transmitted at step 420. For example, only those query suggestions having more than a threshold search results signal ranking and/or having more than a threshold frequency of query are transmitted. In some implementations the query suggestions from the potential query suggestions list may optionally be ranked. For example, those query suggestions having results with the highest signal ranking and/or the highest frequency of query may be ranked the highest and be presented first to a user as a query suggestion (e.g., presented at the top of a query suggestion list). Also, for example, those query suggestions generated from the unmodified query suggestion request may be ranked higher than those generated from the modified query suggestion request. Also, for example, query suggestions may be ranked based on whether they originated from an unmodified query suggestion request or a modified query suggestion request and one or more factor such as signal ranking and/or threshold frequency ranking.

At step 422 a wait cycle may be entered until further partial queries are received at step 402. For example, further partial queries may be received as a result of continued inputting by a user for the same query and/or as a result of inputting a new query by a user. In some implementations step 422 of FIG. 4 and step 312 of FIG. 3 may include one or more common aspects.

Figure 5:
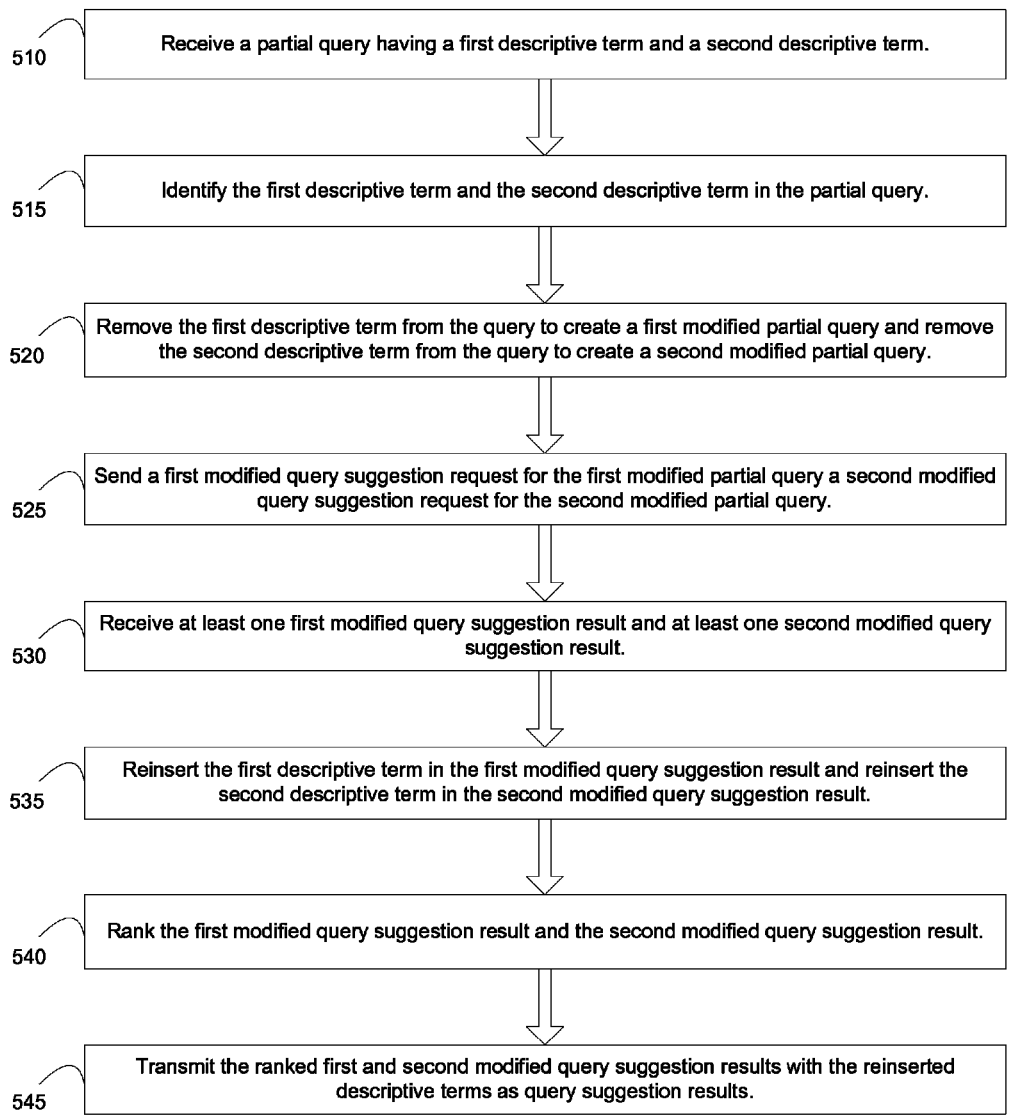
FIG. 5 is a flow chart illustrating an example method of generating query suggestion results for a partial search query containing at least a first descriptive term and a second descriptive term.

FIG. 5 is a flow chart illustrating an implementation of a method of generating autocompletion results for a partial search query containing at least a first descriptive term and a second descriptive term. In the implementation of FIG. 5, both the first descriptive term and the second descriptive term are removed from the partial query and two separate modified query suggestion requests are sent (one that omits the first descriptive term and another that omits the second descriptive term). In other implementations where a partial search query contains multiple descriptive terms, only a single of the descriptive terms may be removed and only a single modified query suggestion request may be sent. In such implementations, which descriptive term is removed may be based on, for example, location of the descriptive term, popularity of the descriptive term, random chance, etc. Other implementations may perform the steps in a different order, omit certain steps, and/or perform different and/or additional steps than those illustrated in FIG. 5.

At step 510 a partial query is received having a first descriptive term and a second descriptive term. In some implementations step 510 of FIG. 5, step 402 of FIG. 4, and/or step 302 of FIG. 3 may include one or more common aspects. At step 515 the first descriptive term and the second descriptive term are identified in the partial query. In some implementations step 515 of FIG. 5, step 412 of FIG. 4, step 316 of FIG. 3, and/or step 210 of FIG. 2 may include one or more common aspects. At step 520 the first descriptive term is removed from the partial query while leaving the second descriptive term in to create a first modified partial query. Also, at step 520 the second descriptive term is removed from the partial query while leaving the first descriptive term in to create a second modified partial query. In some implementations step 520 of FIG. 5, step 412 of FIG. 4, step 316 of FIG. 3, and/or step 215 of FIG. 2 may include one or more common aspects.

At step 525 a first modified query suggestion request is sent for the first modified partial query. Also, at step 525 a second modified query suggestion request is sent for the second modified partial query. In some implementations step 525 of FIG. 5, step 414 of FIG. 4, step 318 of FIG. 3, and/or step 220 of FIG. 2 may include one or more common aspects. At step 530, at least one first modified query suggestion result is received for the first modified query suggestion request and at least one second modified query suggestion result is received for the second modified query suggestion result. In some implementations step 530 of FIG. 5, step 416 of FIG. 4, step 320 of FIG. 3, and/or step 225 of FIG. 2 may include one or more common aspects. At step 535 the first descriptive term is reinserted in the first modified query suggestion result and the second descriptive term is reinserted in the second modified query suggestion result. In some implementations step 535 of FIG. 5, step 418 of FIG. 4, step 324 of FIG. 3, and/or step 230 of FIG. 2 may include one or more common aspects.

At step 540 the first modified query suggestion result and the second modified query suggestion result are optionally ranked. For example, the query suggestion results may be ranked based on the highest signal ranking and/or highest frequency of query. The ranking of the query suggestion results may determine, for example, how the query suggestions results are presented to a user (e.g., highest ranking first) and/or whether they are presented to a user (e.g., lowest ranking(s) omitted). In some implementations step 540 of FIG. 5 and step 326 of FIG. 3 may include one or more common aspects. At step 545 the first modified query suggestion result and the second modified query suggestion result are optionally transmitted with the reinserted descriptive terms for utilization as query suggestions. In some implementations step 545 of FIG. 5, step 420 of FIG. 4, and/or step 310 of FIG. 3 may include one or more common aspects.

Although methods of generating query suggestion results for a partial search query are illustrated in FIGS. 1-4, one of ordinary skill in the art, having had the benefit of the present disclosure, will recognize and appreciate that the methods may additionally and/or alternatively be utilized to generate a query suggestion result for a completed search query. For example, one or more descriptive terms may be removed from a completed query to create a modified completed query that is sent to the query suggestion engine 110. The query suggestion engine 110 may then match the modified completed query to one or more query suggestions to determine one or more query suggestions for the user's completed query. The query suggestion engine 110 provides these query suggestions to the query processing engine 120 for reinsertion of the descriptive term, then the reconstructed query suggestions are provided to the user to be presented as a further potential search that may be conducted. The query suggestions may, for example, be embedded within a search results web page to be displayed in an application, such as the web browser 132.

Certain implementations of the methods of generating a query suggestion result for a partial search query as illustrated in FIGS. 1-4 have been described as taking place in a substantially real time environment. For example, certain implementations have discussed removing one or more descriptive terms from a partial query as that query is being typed by a user, generating a modified query suggestion request with the descriptive term removed, receiving modified query suggestion results, reinserting the descriptive term in the modified query suggestion results, and providing the reconstructed modified query suggestion results back to a user. However, one of ordinary skill in the art, having had the benefit of the present disclosure, will recognize and appreciate that one or more aspects of methods described herein may be implemented in an offline mode. For example, implementations of methods described herein may be utilized to expand the database of queries that are available to the query suggestion engine 110. For example, certain implementations may remove one or more descriptive terms from a stored query (either partial or completed; such as stored previously submitted queries of a query suggestion database), generate modified query requests with one or more descriptive terms of the stored query removed, receive modified query suggestion results, reinsert the descriptive term back in the modified query suggestion results, and store one or more of the reconstructed modified query suggestion results in a query suggestion database for utilization for future query suggestions.

Referring to FIG. 6A, three query suggestion requests that may be transmitted for the query "fat orange cat" are illustrated. The underlining indicates the portion of the query that would be submitted in a query suggestion request and the bracketed non-underlined portion indicates the portion of the query that would be omitted from the query suggestion request. Query suggestion request 601 represents an unmodified query suggestion request for the query. Query suggestion request 602 represents a first modified query suggestion request that omits the descriptive term "fat" and includes described terms "orange" and "cat". Query suggestion request 603 represents a second modified query suggestion request that omits the descriptive term "orange" and includes described term "cat". Query suggestion results from the three requests 601-603 may be analyzed to determine which represent query suggestion results that should be provided to a user and/or stored in a query suggestion database. The omitted descriptive terms from the requests 602 and 603 may be reinserted into any of the query suggestion results from respective of those requests.

Referring to FIG. 6B, three query suggestion requests that may be transmitted for the query "funny videos of red dogs" are illustrated. The underlining indicates the portion of the query that would be submitted in a query suggestion request and the bracketed non-underlined portion indicates the portion of the query that would be omitted from the query suggestion request. Query suggestion request 605 represents an unmodified query suggestion request for the query. Query suggestion request 606 represents a first modified query suggestion request that omits the descriptive term "red" and includes described term "dogs". Query suggestion request 607 represents a second modified query suggestion request that omits the descriptive term "funny" and includes described term "videos". Query suggestion results from the three requests 605-607 may be analyzed to determine which represent query suggestion results that should be provided to a user and/or stored in a query suggestion database. The omitted descriptive terms from the requests 606 and 607 may be reinserted into any of the query suggestion results from respective of those requests.

Referring to FIG. 6C, three query suggestion requests that may be transmitted for the query "funny videos of red do" are illustrated. The underlining indicates the portion of the query that would be submitted in a query suggestion request and the bracketed non-underlined portion indicates the portion of the query that would be omitted from the query suggestion request. Query suggestion request 610 represents an unmodified query suggestion request for the query. Query suggestion request 611 represents a first modified query suggestion request that omits the descriptive term "red" and includes described term "do". Query suggestion request 612 represents a second modified query suggestion request that omits the descriptive term "funny" and includes described term "videos". Query suggestion results from the three requests 610-612 may be analyzed to determine which represent query suggestion results that should be provided to a user and/or stored in a query suggestion database. The omitted descriptive terms from the requests 611 and 612 may be reinserted into any of the query suggestion results from respective of those requests.

FIG. 7 is a partial screenshot that illustrates an example environment that can be used to provide query suggestion results to a user. In FIG. 7, the partial screen shot includes a search field representation 700 and a search button representation 710. In this example, the user has entered the partial query "funny videos of ca" into the search field representation and a drop down menu 720 of the search field is displayed. The drop down menu 720 includes the query suggestions "funny videos of cats talking" and "funny videos of cats walking." The user may optionally choose either of the query suggestions and utilize such suggestion as a completed query or the basis for a completed query.

FIG. 8 is a block diagram of an example computer system 810. Computer system 810 typically includes at least one processor 814 which communicates with a number of peripheral devices via bus subsystem 812. These peripheral devices may include a storage subsystem 824, including, for example, a memory subsystem 826 and a file storage subsystem 828, user interface input devices 822, user interface output devices 820, and a network interface subsystem 816. The input and output devices allow user interaction with computer system 810. Network interface subsystem 816 provides an interface to outside networks and is coupled to corresponding interface devices in other computer systems.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 810 to the user or to another machine or computer system.

Storage subsystem 824 stores programming and data constructs that provide the functionality of some or all of the modules described herein. For example, the storage subsystem 824 may include the logic to create query suggestions for a query based on special processing of a descriptive term of the query according to one or more processes described herein.

These software modules are generally executed by processor 814 alone or in combination with other processors. Memory 826 used in the storage subsystem can include a number of memories including a main random access memory (RAM) 830 for storage of instructions and data during program execution and a read only memory (ROM) 832 in which fixed instructions are stored. A file storage subsystem 828 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 828 in the storage subsystem 824, or in other machines accessible by the processor(s) 814.

Bus subsystem 812 provides a mechanism for letting the various components and subsystems of computer system 810 communicate with each other as intended. Although bus subsystem 812 is shown schematically as a single bus, alternative implementations of the bus subsystem may use multiple busses.

Computer system 810 can be of varying types including a workstation, server, computing cluster, blade server, server farm, or any other data processing system or computing device. Due to the ever-changing nature of computers and networks, the description of computer system 810 depicted in FIG. 8 is intended only as a specific example for purposes of illustrating some implementations. Many other configurations of computer system 810 are possible having more or fewer components than the computer system depicted in FIG. 8.

While several inventive implementations have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive implementations described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive implementations described herein. It is, therefore, to be understood that the foregoing implementations are presented by way of example only and that, within the scope of the appended claims and equivalents thereto, inventive implementations may be practiced otherwise than as specifically described and claimed. Inventive implementations of the present disclosure are directed to each individual feature, system, article, material, kit, and/or method described herein. In addition, any combination of two or more such features, systems, articles, materials, kits, and/ or methods, if such features, systems, articles, materials, kits, and/or methods are not mutually inconsistent, is included within the inventive scope of the present disclosure.

All definitions, as defined and used herein, should be understood to control over vocabulary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one implementation, to A only (optionally including elements other than B); in another implementation, to B only (optionally including elements other than A); in yet another implementation, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

What is claimed is:

1. A computer implemented method for generating query suggestion results for a partial search query, comprising:
   identifying, utilizing one or more processors, a partial search query having a plurality of terms;
   identifying, utilizing the one or more processors, a descriptive term of the terms of the partial search query, the descriptive term paired with at least one described term of the terms of the partial search query;
   transmitting, utilizing the one or more processors, a modified partial query suggestion request for the partial search query, the modified partial query suggestion request omitting the descriptive term and including the at least one described term;
   receiving, utilizing the one or more processors, at least one query suggestion result for the modified partial query suggestion request, the query suggestion result containing the described term; and
   reinserting, utilizing the one or more processors, the descriptive term into the query suggestion result in the same location the descriptive term previously occupied in the partial search query.

2. The method of claim 1, further comprising sending an unmodified partial query suggestion request for the partial query, the unmodified partial query suggestion request containing the descriptive term.

3. The method of claim 2, wherein the step of sending the modified partial query suggestion request for the partial search query only occurs when the unmodified partial query suggestion request fails to return results.

4. The method of claim 2, wherein the step of sending the modified partial query suggestion request for the partial search query only occurs when the unmodified partial query suggestion request returns less than a minimum number of results.

5. The method of claim 2, wherein the step of sending the modified partial query suggestion request for the partial search query only occurs when the unmodified partial query suggestion request returns results having less than a minimum level of frequency of query.

6. The method of claim 2, wherein the step of sending the modified partial query suggestion request for the partial search query only occurs when the unmodified partial query suggestion request returns less than a minimum number of results having more than a minimum level of frequency of query.

7. The method of claim 1, further comprising identifying, in the partial search query, a second descriptive term of the terms; sending a second modified partial query suggestion request for the partial search query, the second modified partial query suggestion request omitting the second descriptive term; receiving at least one second query suggestion result for the second modified partial query suggestion request; and reinserting the second descriptive term into the second query suggestion result.

8. The method of claim 7, wherein the second modified partial query suggestion request includes the first descriptive term.

9. The method of claim 8, wherein the second descriptive term is positionally immediately adjacent the first descriptive term in the partial search query.

10. The method of claim 8, further comprising assigning display order priorities to the first query suggestion result and the second query suggestion result.

11. The method of claim 10, wherein the display order priorities are determined by comparison of a first level of frequency of query of the first query suggestion result and a second level of frequency of query of the second query suggestion result.

12. The method of claim 1, further comprising validating that the step of reinserting the descriptive term into the query suggestion result does not substantially alter the meaning of the query suggestion result.

13. The method of claim 1, further comprising transmitting the query suggestion result with the descriptive term reinserted to at least one client computing device.

14. The method of claim 1, wherein the step of identifying the descriptive term includes consulting a database of descriptive terms.

15. The method of claim 14, wherein the step of identifying the descriptive term includes locating the descriptive term in the database of descriptive terms.

16. The method of claim 15, wherein the step of identifying the descriptive term includes analyzing the context of the descriptive term in the partial search query.

17. A computer implemented method for generating query suggestions results for a search query, comprising:
    identifying, utilizing one or more processors, in a search query having a plurality of terms, a descriptive term of the terms of the search query;
    transmitting, utilizing the one or more processors, a modified query suggestion request for the search query, the modified query suggestion request omitting the descriptive term and including other of the terms of the search query;
receiving, utilizing the one or more processors, a plurality of query suggestion results for the modified query suggestion request;
    omitting, utilizing the one or more processors, at least one unsatisfactory suggestion result from the query suggestion results based on at least one characteristic of the unsatisfactory suggestion results to form a pruned set of the query suggestion results; and
    reinserting, utilizing the one or more processors, the descriptive term into each of the query suggestion results of the pruned set in the same location the descriptive term previously occupied in the search query.

18. The method of claim 17, wherein the at least one characteristic includes at least one of ranking signal and frequency of query.

19. The method of claim 17, further comprising sending an unmodified partial query suggestion request for the partial query, the unmodified partial query suggestion request containing the descriptive term.

20. The method of claim 19, wherein the step of sending the unmodified partial query suggestion request generates at least one unmodified suggestion result.

21. The method of claim 20, wherein the at least one characteristic includes at least one of ranking signal and frequency of query of the unsatisfactory suggestion result as compared to the unmodified suggestion result.

22. The method of claim 20, further comprising assigning display order priorities to the unmodified suggestion result and the query suggestion results of the pruned set.

23. The method of claim 22, wherein the display order priorities are based on at least one of ranking signal and frequency of query of the unmodified suggestion result and the query suggestion results of the pruned set.

24. The method of claim 19, wherein the step of sending the modified partial query suggestion request for the partial search query only occurs when the unmodified partial query suggestion request fails to return results.

25. A system including memory and one or more processors operable to execute instructions stored in memory, comprising instructions to:
    identify a partial search query having a plurality of terms;
    identify a descriptive term of the terms of the partial search query, the descriptive term paired with at least one described term of the terms of the partial search query;
    transmit a modified partial query suggestion request for the partial search query, the modified partial query suggestion request omitting the descriptive term and including the at least one described term;
    receive at least one query suggestion result for the modified partial query suggestion request, the query suggestion result containing the described term; and
    reinsert the descriptive term into the query suggestion result in the same location the descriptive term previously occupied in the partial search query.

26. A non-transitory computer readable storage medium storing instructions that, in response to execution of the instructions by a computing system, cause the computing system to perform the following operations:
    identifying a partial search query having a plurality of terms;
    identifying a descriptive term of the terms of the partial search query, the descriptive term paired with at least one described term of the terms of the partial search query;
    transmitting a modified partial query suggestion request for the partial search query, the modified partial query suggestion request omitting the descriptive term and including the at least one described term;
    receiving at least one query suggestion result for the modified partial query suggestion request, the query suggestion result containing the described term; and
    reinserting the descriptive term into the query suggestion result.

27. A system including memory and one or more processors operable to execute instructions stored in the memory, comprising instructions to:
    identify, in a search query having a plurality of terms, a descriptive term of the terms of the search query;
    transmit a modified query suggestion request for the search query, the modified query suggestion request omitting the descriptive term and including other of the terms of the search query;
    receive a plurality of query suggestion results for the modified query suggestion request;
    omit at least one unsatisfactory suggestion result from the query suggestion results based on at least one characteristic of the unsatisfactory suggestion results to form a pruned set of the query suggestion results; and
    reinsert the descriptive term into each of the query suggestion results of the pruned set.

28. A non-transitory computer readable storage medium storing instructions that, in response to execution of the instructions by a computing system, cause the computing system to perform the following operations:
    identifying, in a search query having a plurality of terms, a descriptive term of the terms of the search query;
    transmitting a modified query suggestion request for the search query, the modified query suggestion request omitting the descriptive term and including other of the terms of the search query;
    receiving a plurality of query suggestion results for the modified query suggestion request;

omitting at least one unsatisfactory suggestion result from the query suggestion results based on at least one characteristic of the unsatisfactory suggestion results to form a pruned set of the query suggestion results; and reinserting the descriptive term into each of the query suggestion results of the pruned set.

\* \* \* \* \*